US009817875B2

(12) United States Patent
Hernandez et al.

(10) Patent No.: US 9,817,875 B2
(45) Date of Patent: Nov. 14, 2017

(54) METHODS AND SYSTEMS FOR AUTOMATED DATA CHARACTERIZATION AND EXTRACTION

(71) Applicant: Conduent Business Services, LLC, Dallas, TX (US)

(72) Inventors: Andres Quiroz Hernandez, Rochester, NY (US); Yasmine Charif, Rochester, NY (US); Julien Jean Lucien Bourdaillet, Rochester, NY (US)

(73) Assignee: Conduent Business Services, LLC, Dallas, TX (US)

( * ) Notice: Subject to any disclaimer, the term of this patent is extended or adjusted under 35 U.S.C. 154(b) by 225 days.

(21) Appl. No.: 14/526,109

(22) Filed: Oct. 28, 2014

(65) Prior Publication Data
US 2016/0117387 A1 Apr. 28, 2016

(51) Int. Cl.
*G06F 17/30* (2006.01)
*G06F 17/27* (2006.01)

(52) U.S. Cl.
CPC .... *G06F 17/30563* (2013.01); *G06F 17/2705* (2013.01); *G06F 17/2745* (2013.01); *G06F 17/3061* (2013.01); *G06F 17/30864* (2013.01)

(58) Field of Classification Search
CPC ......... G06F 17/30864; G06F 17/30867; G06F 17/30991; G06F 17/30696; G06Q 30/02
USPC ....................................................... 707/722
See application file for complete search history.

(56) References Cited

U.S. PATENT DOCUMENTS

| 2002/0156817 | A1  |         | 10/2002 | Lemus |
|---|---|---|---|---|
| 2004/0205448 | A1 | * | 10/2004 | Grefenstette ..... G06F 17/30867 715/230 |
| 2006/0242180 | A1 |   | 10/2006 | Graf et al. |
| 2009/0234826 | A1 | * | 9/2009 | Bidlack ............. G06F 17/30489 707/5 |
| 2010/0205201 | A1 |   | 8/2010 | Krishmamurthy et al. |
| 2010/0275114 | A1 | * | 10/2010 | Bastos dos Santos .................. G06F 17/247 715/228 |
| 2011/0022941 | A1 | * | 1/2011 | Osborne ........... G06F 17/30722 715/230 |

OTHER PUBLICATIONS

Herve Dejean et al., "Method and System of Extracting Label: Value Data from a Document", U.S. Appl. No. 14/475,809, filed Sep. 3, 2014.
Herve Dejean et al., "Method and System of Extracting Structured Data from a Document", U.S. Appl. No. 14/107,333, filed Dec. 16, 2013.

(Continued)

*Primary Examiner* — Pierre Vital
*Assistant Examiner* — Andrew N Ho
(74) *Attorney, Agent, or Firm* — MH2 Technology Law Group LLP (57) ABSTRACT

A system and method for characterizing textual data by generating a first data abstraction based on a set of textual data. The first data abstraction can be presented to a user, and the user can provide instructions to make changes to the first data abstraction to generate a second data abstraction. The textual data can be extracted and characterized from the set of textual data using the second data abstraction.

20 Claims, 8 Drawing Sheets

(56) References Cited

OTHER PUBLICATIONS

Kedar Bellare et al., "Generalized Expectation Criteria for Bootstrapping Extractors using Record-Text Alignment", Proceedings of the Conference on Empirical Methods in Natural Language Processing, Aug. 2009, pp. 131-140.

Yunyao Li et al., "Regular Expression Learning for Information Extraction", Proceedings of the Conference on Empirical Methods in Natural Language Processing, Oct. 2008, pp. 21-30.

Fei Nan et al., "A Sort-based Algorithm for Multiple Sequence Alignment", Proceeding of the Conference on Computational Systems Bioinformatics, Jul. 2007, pp. 1-6.

Yanhong Zhai et al., "Web Data Extraction Based on Partial Tree Alignment", Proceeding of the International World Wide Web Conference Committee, May 2005, pp. 1-10.

Lusheng Wang et al., "On the Complexity of Multiple Sequence Alignment", Journal of Computational Biology, vol. 1, No. 4, 1994, pp. 337-348.

Jens Stoye, "Multiple Alignment, Index Structures, Suffix Trees", http://www.dynamics.unam.edu/users/citasHCC/MultipleAlignmentIndexStructuresSuffixTrees.pdf, Retrieved from the Internet on Oct. 21, 2014, pp. 1-17.

"Multiple Sequence Alignment", Wikipedia: The Free Encyclopedia, http://en.wikipedia.org/wiki/Multiple_sequence_alignment, Retrieved from the Internet on Oct. 21, 2014, pp. 1-7.

Lev Reyzin, "On Learning Regular Languages", CSTheory Community Blog, http://cstheory.blogoverflow.com/2011/08/on-learning-regular-languages/, Aug. 2011, pp. 1-3.

Mark James Ennis, "txt2re: Headache Relief for Programmers :: Regular Expression Generator", http://txt2re.com/, 2006, p. 1.

Jan Goyvaerts, "RegexMagic: Regular Expression Generator", http://www.regular-expressions.info/regexmagic.html, Page last updated Oct. 2013, pp. 1-2.

Henning Fernau, "Algorithms for Learning Regular Expressions", Lecture Notes in Computer Science: Algorithmic Learning Theory, vol. 3734, 2005, pp. 1-15.

\* cited by examiner

\|"?<date>\|"?;\|"?\|*\|*<identifier>-<employee_name><employee_identifier>?\|*\|* ATLAS UPDATE SR#<sr_number>\|*\|*CONTACT IS<contact_name>(,<text>)?\,<text>

'18-JUN-12',"ATLAS UPDATE SR# 1-1444444444  USA55555 : S.VOLTARE  CONTACT IS ARES BOAT, M02 TELESALES, 55559745. RESOLVING. PROBLEM DETAILS: UPON RESOLUTION, CONTACT THE ORIGINATOR VIA EMAIL: ARES.BOAT@EXAMPLE.COM * ADDED : DHZ03 & UPDATED THE MSC FROM GEN TO CMA PER REQUEST FROM INDIRECT CHANNEL SLS MGR: ARES BOAT @ 955-555-5132. CLOSED LOOP VIA EMAIL TO ARES W/ COPY TO CAROL S. SHADE. CLOSING SR #1-1444444444. ***","1-PMXZRT" — 310

"18/06/2012"," USA44444 - FRANK CARY X2341  ATLAS UPDATE SR# 1-1222222222  CONTACT IS JULES VERNE, A04 SALES SUPPORT, 75556345. LOGGING. PROBLEM DETAILS: UPON RESOLUTION, CONTACT THE ORIGINATOR VIA EMAIL: JULES.VERNE@EXAMPLE.COM. * ***","1-REVY66" — 320

METHODS AND SYSTEMS FOR AUTOMATED DATA CHARACTERIZATION AND EXTRACTION

TECHNICAL FIELD

The present disclosure relates generally to methods, systems, and computer-readable media for dynamic data characterization and extraction.

BACKGROUND

Human analysts are often tasked with analyzing data with little or no prior knowledge about the data. Large amounts and/or varying formats of data can make such an analysis time consuming, costly, error-prone, or even unfeasible.

Current software systems can be used to assist with parsing, characterizing, and extracting the data. However, such systems may require large amounts of manual setup, may provide limited characterization, may not adjust well to changes in data format, and may still miss or misinterpret relevant data.

Therefore, data characterization systems can be improved by methods and systems that can automatically and dynamically characterize data.

SUMMARY

The present disclosure relates generally to methods, systems, and computer readable media for providing these and other improvements to data characterization systems.

In some embodiments, a computing device can receive an original set of textual data. The original set of textual data can include multiple data records. The computing device can generate a first data abstraction based on the original set of textual data, and can present the first data abstraction to a user. The user can provide instructions to make changes to the first data abstraction to generate a second data abstraction. The computing device can extract characterized textual data from the original set of textual data using the second data abstraction.

In further embodiments, the computing device can receive a new set of textual data. The new set of textual data can include multiple data records. The computing device can extract characterized textual from the new set of textual data using the second data abstraction.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 1:
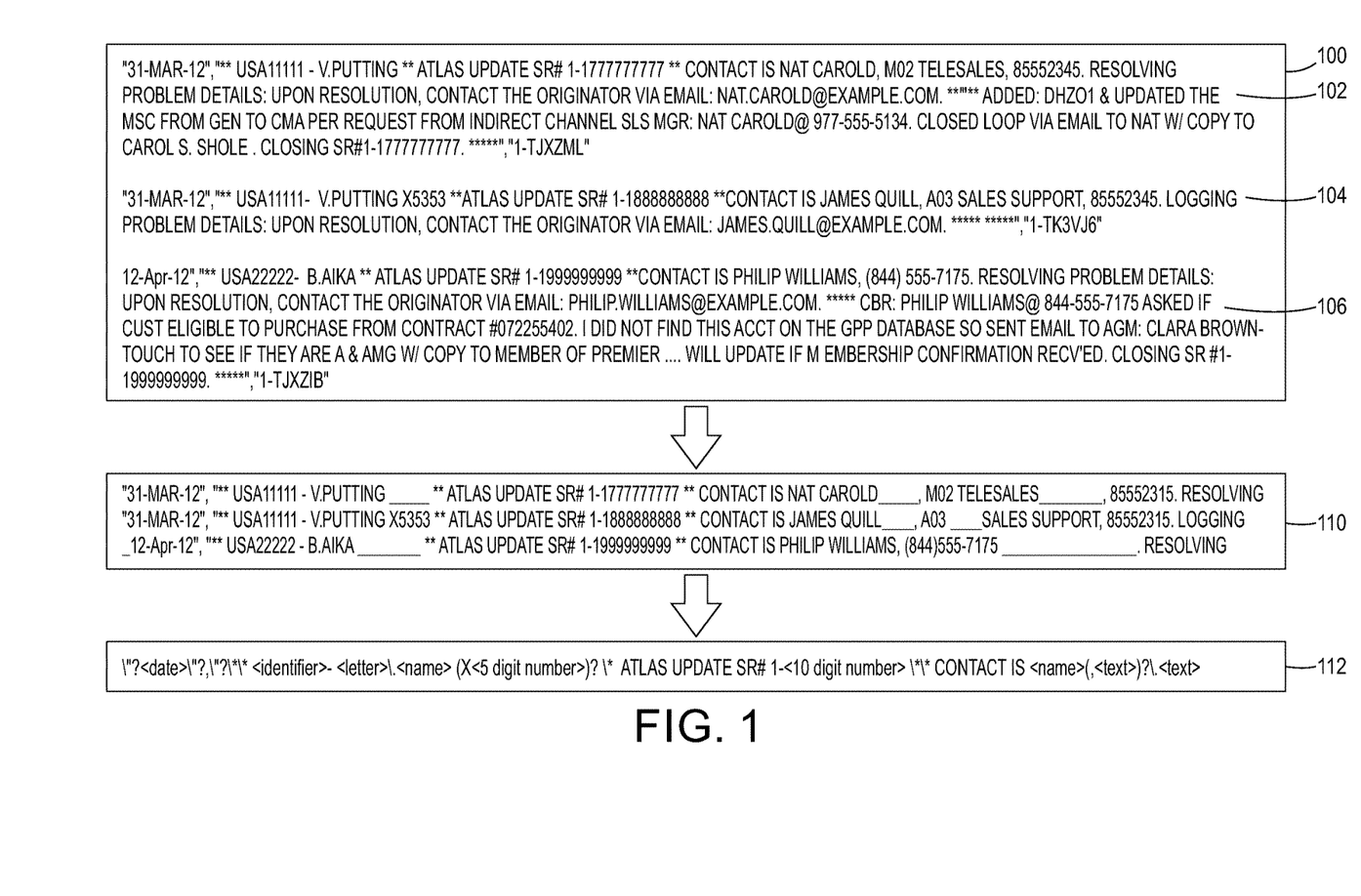
FIG. 1 is a diagram depicting an exemplary process of generating a regular expression from received data, consistent with certain disclosed embodiments.

FIG. 1 is a diagram depicting an exemplary process of generating a regular expression from received data, consistent with certain disclosed embodiments. The process can start when a computing device receives one or more files containing textual data. In some embodiments, the textual data can be semi-structured data. Semi-structured data is a form of data that does not conform to a particular formalized data structure (e.g. data structures associated with relational databases or other forms of data tables). However, semi-structured data can contain tags or other markers to separate semantic elements and/or enforce hierarchies of records and fields within the data. In other embodiments, the textual data can be structured.

For example, box 100 includes semi-structured data. Box 100 includes data records 102, 104, and 106. Data records 102, 104, and 106 may not conform to a particular formalized data structure. Additionally, because of inconsistences between the data records, data records 102, 104, and 106 do not conform to a single consistent data structure. For example, data record 106 does not include an opening quotation mark before the date, unlike data records 102 and 104, consistent telephone number formats are not used among the data records, etc.

The process can continue when the computing device performs multi-sequence alignment on the textual data. In some embodiments, multi-sequence alignment can be performed using every record, while, in further embodiments, the multi-sequence alignment may be performed using a sample subset of records from the textual data.

As used herein, multi-sequence alignment is a process that determines or attempts to determine a minimum edit distance between two or more strings and, consequently, an alignment between the strings.

In some embodiments, a goal of multi-sequence alignment is to seek to minimize an overall or aggregate distance metric between all pairs of strings in a set of n strings to find a set of substrings that are matched (align) among all, a majority, or a plurality of the n strings.

In some implementations, suffix trees, sorting, and iterative methods can be used to perform a multi-sequence alignment. Such methods can enhance the scalability of multi-sequence alignment. Increased scalability is important to handle large amounts of textual data, which can require aligning in the order of millions or more records.

For example, box 110 includes partially aligned sequences based on the three data records from box 100. The partially aligned sequences are merely for the purpose of illustration, and do not necessarily constitute an optimal alignment.

The partially aligned sequences include gaps (marked by underscores) that have been introduced to better align common regions. These can represent areas of variable content in the records. Regions may correspond to local alignments between different sets of strings (e.g. the first string and the second string) or between all strings. Regions common to all strings may be more likely to be part of a final alignment.

The process can continue when the computing device generates a data abstraction expression based on the textual data. In some embodiments, the data abstraction can be based on the entire record, while, in further embodiments, the data abstraction can be based on a sample subset of records from the textual data.

The examples described herein will utilize regular expressions. However, other forms of data abstractions may be used, consistent with certain disclosed embodiments. As used herein, a regular expression is a sequence of characters that represents an abstraction of two or more strings. In some embodiments, each character in a regular expression is either a metacharacter with a special meaning (e.g. "\" and "?"), or a regular character with its literal meaning (e.g. content). For example, a question mark (?) can indicate that a character is optional, a pair of parentheses in front of a question mark (?) can indicate that the enclosed area is optional, a backslash (\) can indicate an escape character, etc.

Metacharacters and regular characters can be used together to represent patterns in two or more strings. In further embodiments, certain text regions can be identified, categorized, and replaced with tags in a regular expression. For example, dates, names, and/or addresses may be identified based on common formats, categorized, and then replaced with a tag representative of their category (e.g. <date>, <name>, and <address>) in the regular expression.

For example, box 112 includes a regular expression based on the three data records from box 100. The regular expression is merely for the purpose of illustration, and does not necessarily constitute an optimal regular expression.

The regular expression includes tags (marked by <and>), metacharacters (e.g. \ and ?), and regular characters (e.g. ATLAS UPDATE).

Regular expressions can be used to capture the structure and content of data and to parse the date to extract the content.

Figure 2A:
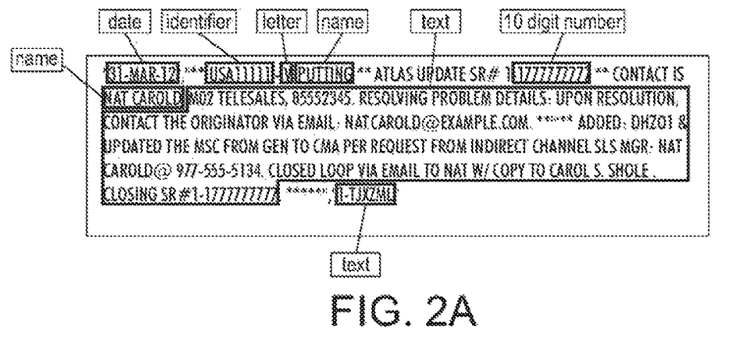
FIG. 2A is a diagram depicting an exemplary data record with data characterizations displayed for a user, consistent with certain disclosed embodiments.

FIG. 2A is a diagram depicting an exemplary data record with data characterizations displayed for a user, consistent with certain disclosed embodiments. FIG. 2A represents a data record that can be displayed for user after a regular expression is obtained, for example, via the method discussed above with regard to FIG. 1. For example, box 200 can include a data record with regions identified based on the regular expression shown in box 112 of FIG. 1.

Based on the displayed information, a user may be able to determine whether regions are correctly identified, delineated, tagged, etc.

The data record displayed in box 200 can, in some embodiments, be randomly chosen from data records used to generate the regular expression. In other embodiments, the data record can be chosen based on how well it fits the regular expression. For example, a data record with a high match score may be used, while, in other embodiments, a data record with a low match score may be used.

Figure 2B:
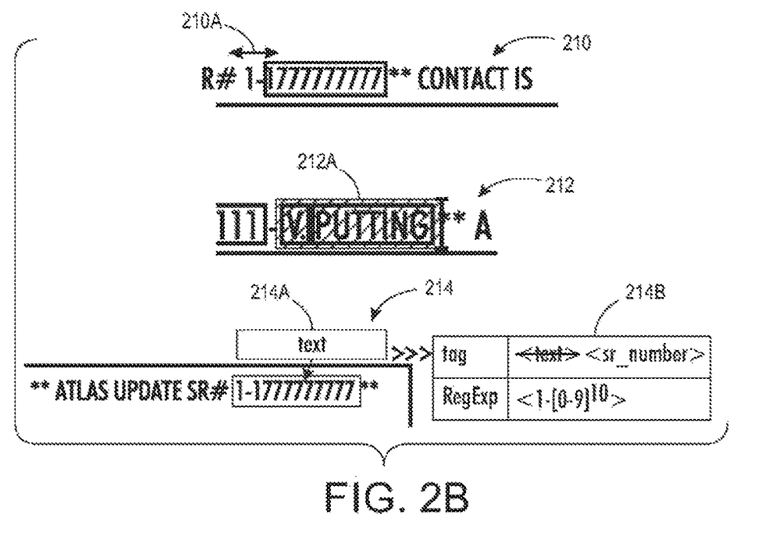
FIG. 2B is a diagram depicting exemplary changes that can be made by a user to displayed data characterizations, consistent with certain disclosed embodiments.

Based on the display, the user may decide to make changes to the regions, as shown with regard to FIG. 2B.

FIG. 2B is a diagram depicting exemplary changes that can be made by a user to displayed data characterizations, consistent with certain disclosed embodiments. In particular, FIG. 2B depicts three different examples of changes that a user can make after a data record is displayed with data characterizations highlighted based on a regular expression.

Item 210 represents that a user can extend a region, which is depicted by arrow 210A. For example, if a user notices that a region fails to include additional content that should be part of the region, but was incorrectly excluded and/or included as part of a separate region, the user can provide instructions to extend the region. Examples of when a region can fail to include all content that should be part of the region include: when segments of the content are the same across multiple records while other segments in the same region are not the same, when the region includes delimiters (e.g. dashes, commas, etc.), etc.

Item 212 represents that a user can merge multiple regions, which is depicted by box 212A. For example, if a user notices that two regions should be a single region, but the regions were incorrectly separated, the user can provide instructions to combine the regions. Examples of when a region is incorrectly split into two or more regions include: when the region includes delimiters, when a region uses alphanumeric text, etc.

Item 214 represents that a user can view and/or edit tag information, which is depicted in box 214B by <text> being struck through and <sr_number> being added. The region that is edited is represented by box 214A. For example, certain regions may be identified by the processes described herein, but the region may not have a particular known/common format (e.g. a date or a name). Instead the region may be specific to an industry, a company, an individual, etc., and, accordingly, the region can potentially be better labeled by a user. As shown with regard to item 214, a string of numbers may be labeled as merely a region of text by a computing device, but a user may be identify that the numbers have a particular meaning with regard to the data and change the tag accordingly.

In further embodiments, the user may be able to edit the regular expression information. For example, a more sophisticated user may be able to determine whether the identified regular expression segment corresponding to a region is accurate, and update the regular expression accordingly.

Figure 2C:
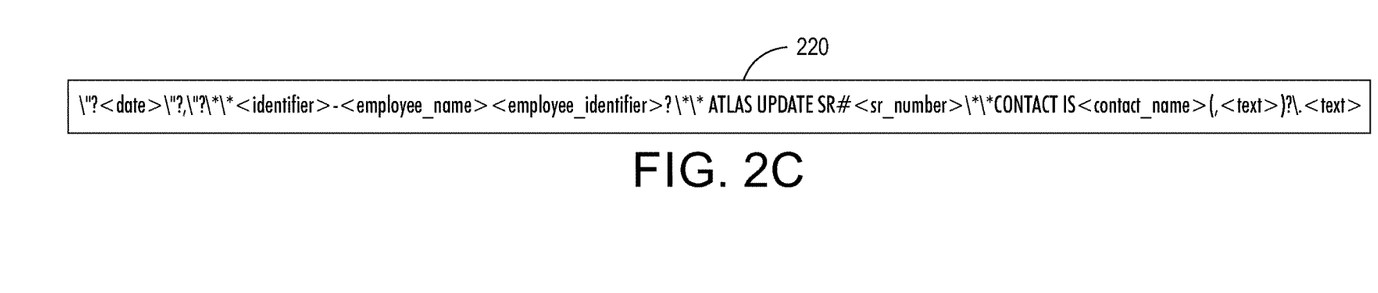
FIG. 2C is a diagram depicting an exemplary regular expression that can be generated based on received data and user input, consistent with certain disclosed embodiments.

FIG. 2C is a diagram depicting an exemplary regular expression that can be generated based on received data and user input, consistent with certain disclosed embodiments. In particular, item 220 represents a regular expression generated after user adjustments to regular expression 112 in FIG. 1.

Regular expression 220 can be generated based in part on user inputs. For example, the user can indicate that the region identified as <letter>, the period, and the name identified as <name> can be merged together into one region identified as <employee_name>. Additionally, the optional region identified as (X<5digit number>)? can be replaced with tag <employee_identifier>?, indicating that the region represents the region represents an employee identifier and is optional.

Regular expression 220 represents a regular expression that was created using the automated efficiency of a computing device, to parse through large amounts of data, combined with a human user that is capable of correcting any mistakes and applying more appropriate tags. Accordingly, regular expression 220 is an improved regular expression compared to regular expression 112, generated prior to the user input.

Regular expression 220 can then be used to characterize and extract the remaining data and/or any new data that is received.

Figure 3:
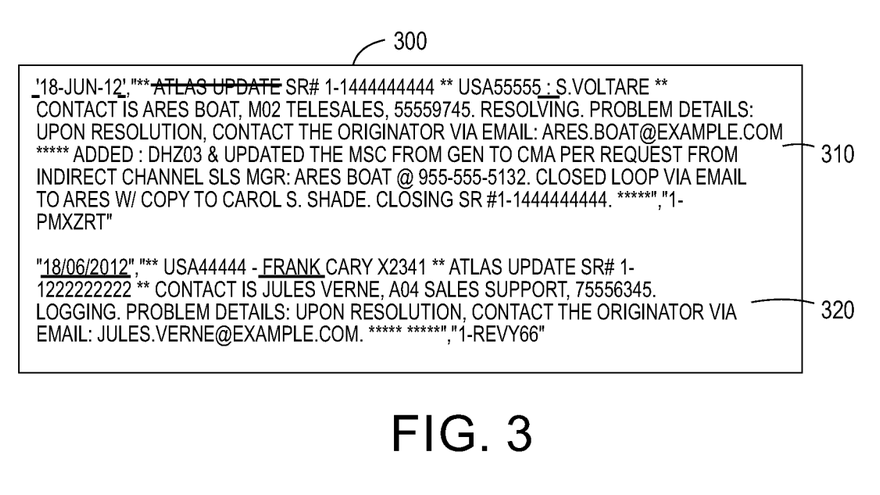
FIG. 3 is a diagram depicting exemplary data records with changes in format, consistent with certain disclosed embodiments.

FIG. 3 is a diagram depicting exemplary data records with changes in format, consistent with certain disclosed embodiments. In particular, FIG. 3 depicts a box 300 with two additional data records 310 and 320 that can be received by a computing device and matched to a regular expression previously generated by the computing device. For example, the additional records can be matched to regular expression 220 from FIG. 2C.

In some embodiments, the additional records may partially, but not completely match the format of previous records used to generate the regular expression. In such cases, such as the example depicted in FIG. 3, the computing device can attempt to match regions from the regular expression with regions in the additional records.

For example, the computing device can determine that there are inconsistent formats between the additional records and previous records, can identify the regions that are consistent, can identify the regions that are inconsistent, and then can present one or more records from the additional records to the user. Changes in the format can be indicated. Accordingly, the user can be aware of the reasons that certain data is unable to be extracted, and, in some embodiments, can further label and/or fix regions.

In some embodiments, the computing device may only present the additional records to the user if a sufficient number of matching regions are not obtained. In other words, the computing device can attempt to match regions in the additional records to the regular expression, and determine a number of matched regions. If the number is below a threshold, the computing device can present one or more of the additional records to the user. If the number is above or equal to a threshold, the computing device can proceed normally by using the regular expression to characterize and extract data from the additional records.

The change indicators shown in FIG. 3 are merely exemplary and, in further embodiments, different formats and styles of presentations can be used to present the records and indicate the changes.

Figure 4:
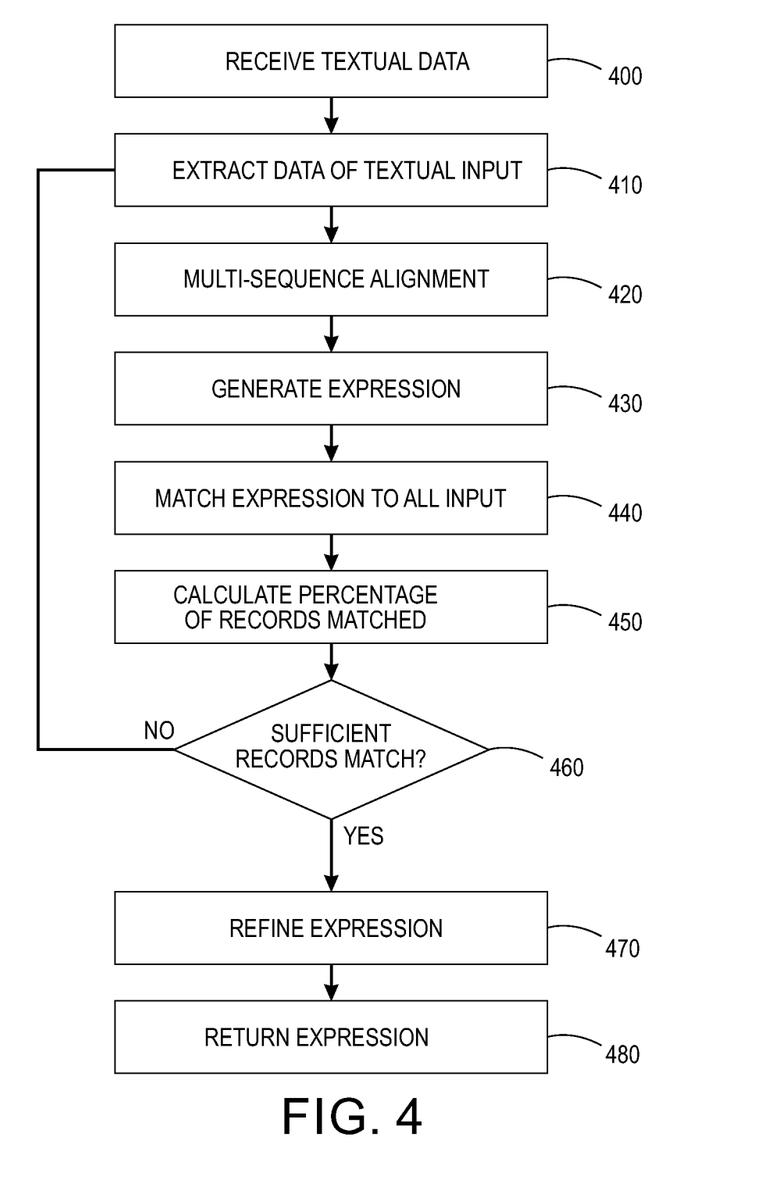
FIG. 4 is a flow diagram illustrating an exemplary method of generating a regular expression from received data, consistent with certain disclosed embodiments.

FIG. 4 is a flow diagram illustrating an exemplary method of generating a regular expression from received data, consistent with certain disclosed embodiments. The method can begin in 400 when a computing device receives one or more files containing textual data. In some embodiments, the textual data can be semi-structured data, and, in other embodiments, the textual data can be structured.

In 410, the computing device can extract a sample of the textual data. In some embodiments, the sample can be a random set of a predetermined percentage of records in the data. In other embodiments, the sample can be a fixed sized set. Other sizes and methods of obtaining sample sets can be utilized, consistent with certain disclosed embodiments.

In 420, the computing device can perform a multi-sequence alignment of the sample of the textual data. In some embodiments, the multi-sequence alignment can be performed on the entire sample, while, in further embodiments, the multi-sequence alignment can be performed on a sub-set of the sample.

The computing device can using one or more of suffix trees and sorting, or iterative methods to perform the multi-sequence alignment. The computing device can determine a minimum edit distance between strings in the sample and align the strings.

Depending on the alignment method used, it may be possible to identify sequences that are aligned in a sufficient number of, but not all, records. If a sufficient number of records are not aligned, the non-aligned sequences can be used to recognize the limits of any optional parts. However, some optional parts may not meet the sufficiency criteria and, thus, will not be recognized as optional parts. They, instead, may be labeled (incorrectly) as content. Such an incorrect label can be corrected by a user in subsequent steps.

In 430, the computing device can generate an abstraction of the sample of the textual data. For example, the computing device can generate a regular expression. In some embodiments, the computing device can generate the regular expression using the aligned strings created in the previous step.

The computing device can identify, for example, fixed regions, variable content, and optional regions. Fixed regions (herein also referred to as structure) can be regions that do not change (either in actual text or in position) in any of the records in the sample, the data set, or in a threshold number or percentage of records.

Variable content (herein also referred to as content) can be regions that contain textual data that regularly changes between records and, thus, cannot be classified as structure. Content found in the same position among records relative to structure can be defined as a field, such that a record can be described as an alternating sequence of structures and fields. Data whose format is not self-describing (e.g. where prior knowledge such as fixed field length is required) may not be analyzed in such a way.

In some embodiments, the computing device can rudimentarily categorize the content (e.g. <identifier>, <name>). In other embodiments, the computing device can simply categorize the content as content or as text.

Optional regions can be structure or field regions that are not in every record or are not in a threshold number of records. In some embodiments, optional parts can also include content that cannot be isolated as an individual field by existing structure.

The structures, fields, and optional regions can be combined, based on the alignment, to create the regular expression.

In 440, the computing device can attempt to match the generated regular expression to the remaining records from the received textual data. The computing device can determine which records are considered a match (e.g. contain a threshold number of matching regions) and which records are not considered a match (e.g. contain less than a threshold number of matching regions).

In 450, the computing device can calculate a percentage of records that are matched by comparing the number of records that are considered a match to the number of records that are not a match.

If, in 460, the percentage of records that are matched is less than a threshold percentage, the method can return to 410 and extract a new sample of the textual data (i.e. resample). In some embodiments, an iteration number limit may prevent the computing device from returning to 410 if steps 410-460 have already been performed a number of times that equals or exceed the iteration number limit. In such embodiments, for example, the regular expression with the highest number of matching records may be used when proceeding to 470.

In some embodiments, the resampling can be done proportionally to the complementary percentages (p, 1-p) of matching (p) and non-matching (1-p) records. Thus, a percentage p of the sample will be taken from the matching records, and a percentage 1-p from the non-matching records. Such a resampling strategy can help insure that a sufficient novelty in the sample (from non-matched records) exists, and can foster improvement while progressively favoring accuracy to prevent significant decline in accuracy of the regular expression.

In some embodiments, some parts of the regular expression generated in 430 may be carried over, while, in other embodiments, there may be no carry-over of the previous expression. In embodiments where there is carry-over, the carry-over strategies may be designed to facilitate or possibly guarantee convergence, or to prevent discarding the best expressions found.

If, in 460, the percentage of records that are matched is greater than or equal the threshold percentage, the method can proceed to 470. In 470, in some embodiments, the computing device can refine the regular expression.

In order to refine the regular expression, the computing device can recursively apply the expression learning method from 410-430 or other regular expression learning methods with the content fields of the data. This can provide a more precise expression.

For example, the content may merely be identified as <content> or <text> at this point. By recursively applying the expression learning method content may be identified as, for example, optional structure elements, categorical elements, predefined character classes, or fixed length fields.

Optional structure elements can be content that exhibits a pattern of fixed characters alternating with empty records. In some cases, this can recover some structure misclassified as content. For example, this can allow the computing device to identify double quotes missing in some date fields like "31-MAR-12" and 31-MAR-12".

Categorical elements can be fields that contain a small number of differing records relative to the total number of records. For example, it can be content that is alternately female, male, or other.

Predefined character classes can be fields that only contain characters from a small set of predefined character classes such as <letter> and <digit> as in X5353.

Fixed length fields can be fields which all have a fixed number of characters, such as, for example, <10 digit number>.

In some embodiments, the content may be identified as a combination of the above classifications.

Accordingly, the rudimentarily identified content can be replaced in the regular expression with a more specific classification.

In 480, the computing device can save and/or return the final generated regular expression.

While the steps depicted in FIG. 4 have been described as performed in a particular order, the order described is merely exemplary, and various different sequences of steps can be performed, consistent with certain disclosed embodiments. Additional variations of steps can be utilized, consistent with certain disclosed embodiments. Further, the steps described are not intended to be exhaustive or absolute, and various steps can be inserted or removed. For example, in some embodiments, multi-sequence alignment may not be performed and/or the regular expression may not be refined.

Figure 5:
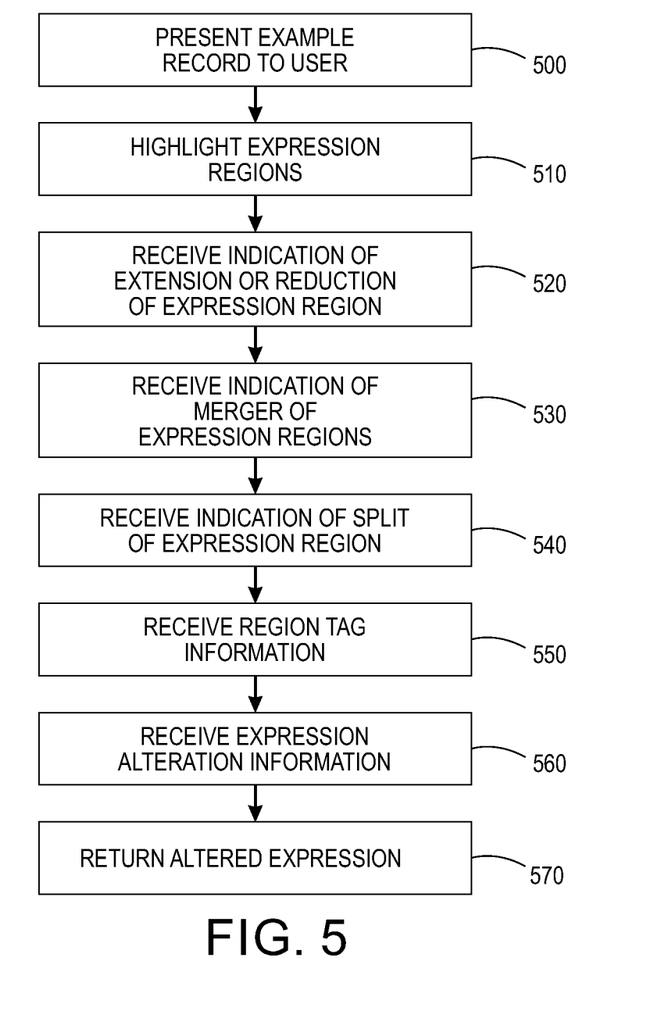
FIG. 5 is a flow diagram illustrating an exemplary method of generating a regular expression based on received data and user input, consistent with certain disclosed embodiments.

FIG. 5 is a flow diagram illustrating an exemplary method of generating a regular expression based on received data and user input, consistent with certain disclosed embodiments. The method can begin after a regular expression is generated using, for example, the process described with regard to FIG. 4.

In 500, the computing device can use the generated regular expression to create a presentation for a user that combines the regular expression with one or more example records from the received textual data.

For example, in 510, the computing device can highlight expression regions and label the highlighted regions with corresponding tags.

The data record presented to the user can, in some embodiments, be randomly chosen or, in other embodiments, can be chosen based on how well it fits the regular expression. For example, a data record with a high match score may be used, while, in other embodiments, a data record with a low match score may be used.

Based on the display, the user may decide to make changes to the regions.

In some embodiments, in 520, the user can decide to extend or reduce a highlighted region, and the computing device can receive an indication to extend or reduce the highlighted region. In further implementations, any text that is left out after a reduction may be added to the general structure of the regular expression. For example, if a text region was reduced and left a special character, such as a dash, the dash may then be added to the general structure of the regular expression.

In further embodiments, in 530, the user can decide to merge two or more regions, and the computing device can receive an indication to merge the two or more highlighted regions.

In some implementations, in 540, the user can decide to split a region into two or more regions, and the computing device can receive an indication to split the highlighted regions. In further implementations, any text that is left out of the split may be added to the general structure of the regular expression. For example, if a text region was split before and after a special character, such as a dash, the dash may then be included into the general structure of the regular expression.

In some embodiments, in 550, the user may also decide to make changes to the tag information. For example, the user can change generic tags to more specific tags based on their knowledge, specific terms for a business/company, etc. For example, the computing device may identify a region of content as a ten digit number, but the user may be able to identify that the ten digit number represents an employee identification number, and may update the tag accordingly.

In further embodiments, in 560, the user may also decide to make changes to the actual regular expression. For example, the user may see that the regular expression region corresponding to employee names is <[A-Z].[A-Z]> and may want to change the expression to also include lowercase letters, e.g. <[a-zA-Z].[a-zA-Z]>.

In 570, the computing device can generate a new regular expression based on one or more indications received from the user in 520-560.

The steps depicted in FIG. 5 and, in particular, steps 520-560 are not intended to be performed in any particular order, and the order shown is merely exemplary, and various different sequences of steps can be performed, consistent with certain disclosed embodiments. Additionally, steps 520-560, in particular, are optional, and described embodiments can use all, some, or none of steps 520-560. Additional variations of steps can be utilized, consistent with certain disclosed embodiments. Further, the steps described are not intended to be exhaustive or absolute, and various steps can be inserted or other steps removed.

Figure 6:
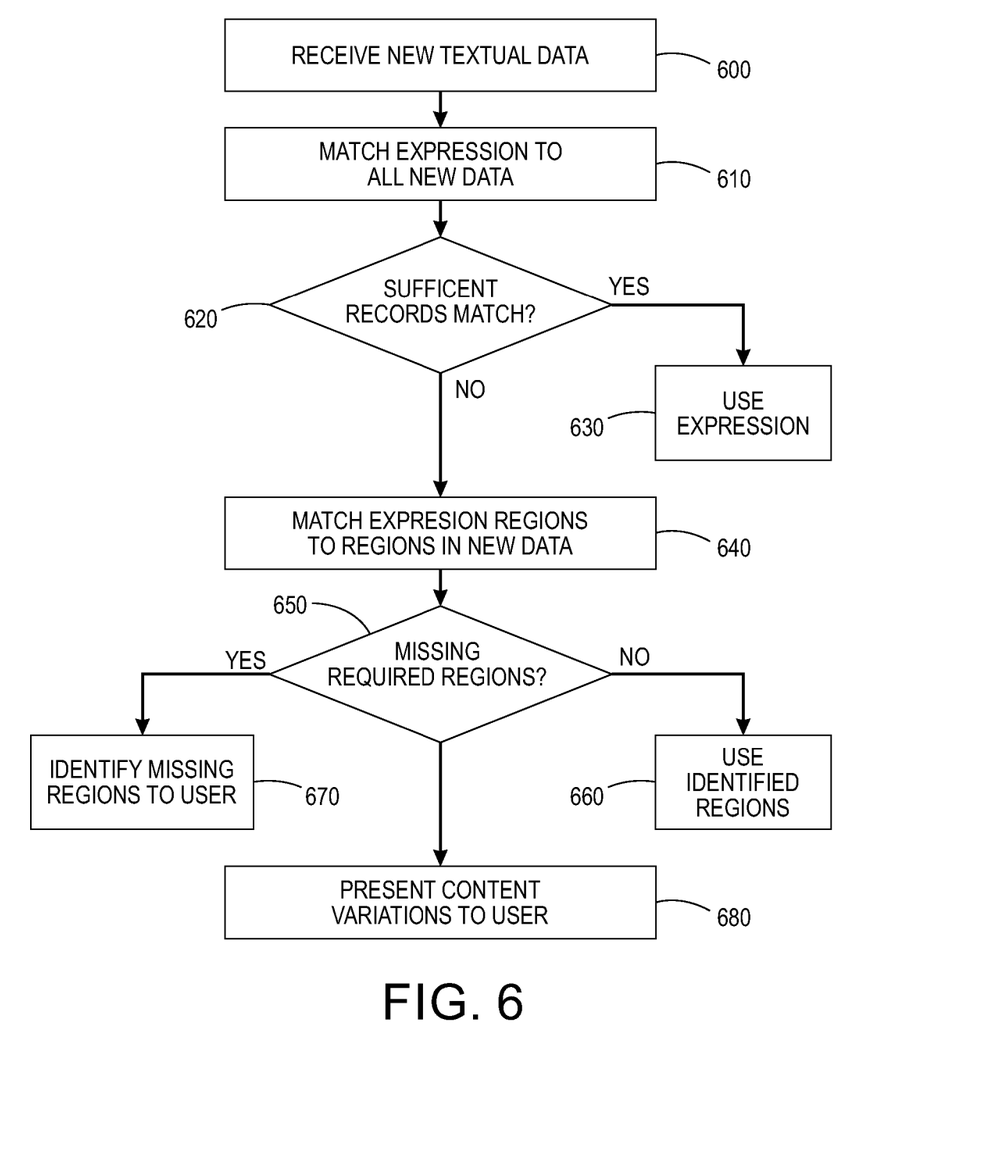
FIG. 6 is a flow diagram illustrating an exemplary method of identifying and responding to changes in data format, consistent with certain disclosed embodiments.

FIG. 6 is a flow diagram illustrating an exemplary method of identifying and responding to changes in data format, consistent with certain disclosed embodiments. The method can begin after a regular expression is generated using, for example, the process described with regard to FIG. 4 and, optionally, after the regular expression is adjusted by a user using, for example, the process described with regard to FIG. 5.

In 600 the computing device can receive one or more files containing new textual data. The new textual data can refer to data that is received after a regular expression is generated using an original set of textual data. In some embodiments, the new textual data can be semi-structured data, and, in other embodiments, the textual data can be structured.

In 610, the computing device can attempt to match the generated regular expression to the records from the new textual data. The computing device can determine which records are considered a match (e.g. contain a threshold number of matching regions) and which records are not considered a match (e.g. contain less than a threshold number of matching regions).

In 620, the computing device can calculate a percentage of records that are matched by comparing the number of records that are considered a match to the number of records that are not a match.

If, in 620, the percentage of records that are matched is greater than or equal the threshold percentage, the method can proceed to 630 and use the regular expression to extract, characterize, and/or analyze the new textual data.

If, in 620, the percentage of records that are matched is less than a threshold percentage, the method can return to proceed to 640

In 640, the computing device can attempt to match expression regions to regions of each record in the new textual data. In some embodiments, 640-680 may only be performed on data records that did not match the generated regular expression. In other embodiments, 640-680 may be performed on all data records in the new textual data.

In some embodiments, the computing device may match regions in the regular expression to regions in one or more records of the new textual data based on a similar content type of similar content structure. For example, the computing device may match a date region of the regular expression with a date region of one or more records of the new textual data even if the date region is in a different location relative to the original textual data.

As shown in FIG. 2 and FIG. 3, the computing device may match a date region and SR Number region of regular expression 220 and with the date region and SR Number region of record 310. The regions can be matched because they have the same format, dd-mm-yyyy and 10-digit number, respectively. The regions can be matched despite the fact that their locations are different than the respective regular expression region. The location is different because the wrong structure is used, e.g., a single quotation (') instead of a double quotation (") and the missing text ATLAS UPDATE.

In further embodiments, the computing device may match regions in the regular expression to regions in one or more records of the new textual data based on similar locations in the regular expression and the one or more records. For example, the computing device may match a 10-digit integer to a 9-digit integer based on similar locations in the regular expression and the one or more records.

As shown in FIG. 2 and FIG. 3, the computing device may match a date region and SR Number region of regular expression 220 and with the date region and SR Number region of record 320. The regions can be matched based on their location (i.e. based on the surrounding structure). In record 320 and regular expression 220, the date region is enclosed in double quotation marks (") and the SR Number follows the text ATLAS UPDATE. The regions can be matched despite the fact that their format is different than the respective regular expression region. The format is different because the date in record 320 uses a dd/mm/yyyy format and the SR Number is 9 digits, while the regular expression 220 expects a date in a dd-mmm-yy format and an SR Number that is 10 digits.

In 650, the computing device can determine if there are any required regions and whether the required regions are missing or are not identifiable in the new textual data. For example, certain regions can be identified as part of a search (e.g. a subject of a search or required for a search) by, for example, a user or a specific application process.

The computing device can match any identified regions in 640 with the required regions and, if all required regions are matched and/or no required regions are indicated, the process can proceed to 660 where the identified regions are used and data is characterized and extracted. In some embodiments, the computing device may also identify any non-required regions that are missing.

If, in 650, one or more required regions are not matched to identified regions in the new textual data, the process can proceed to 670, where the computing device can identify the missing required regions to the user. In some embodiments, the computing device may also identify and/or use any identified regions.

In some embodiments, whether there are missing required regions or no missing required regions, the computing device can present any structure changes and/or missing regions to the user. For example, an example record can be used from the new textual data. The example record can be presented to the user, and any structure changes and/or missing regions can be indicated by highlighting the changes and/or superimposing the changes over the example record.

While the steps depicted in FIG. 6 have been described as performed in a particular order, the order described is merely exemplary, and various different sequences of steps can be performed, consistent with certain disclosed embodiments. Additional variations of steps can be utilized, consistent with certain disclosed embodiments. Further, the steps described are not intended to be exhaustive or absolute, and various steps can be inserted or removed.

Figure 7:
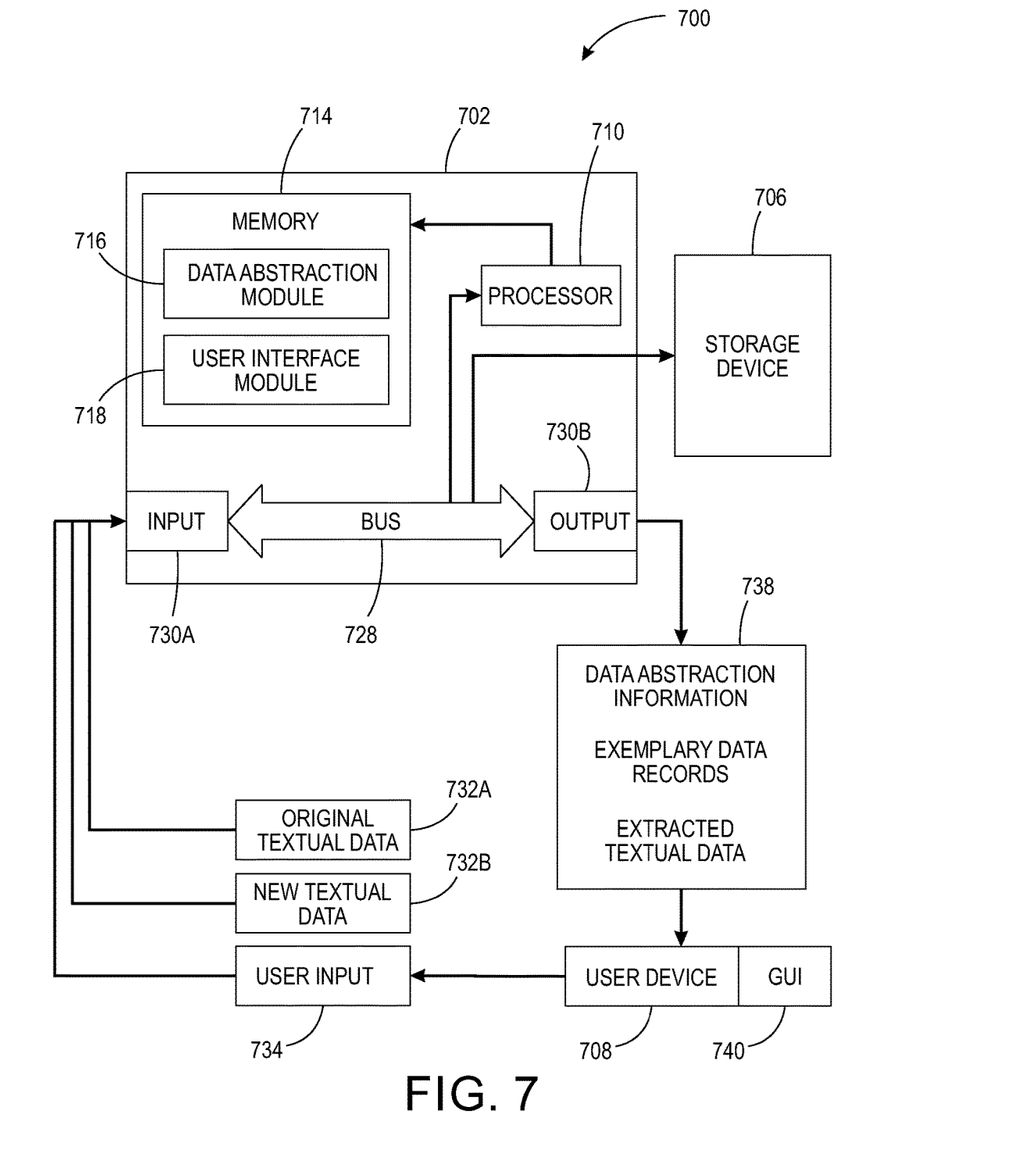
FIG. 7 is a diagram illustrating an exemplary hardware system for data characterization, consistent with certain disclosed embodiments.

FIG. 7 is a diagram illustrating an exemplary hardware system for data characterization, consistent with certain disclosed embodiments. The system includes a data characterization device 702 and a storage device 706, which may part of the same device or may be linked together by communication links (i.e. a network). In one embodiment, the system 700 may further include a user device 708. In some embodiments, data characterization device 702 and user device 708 may be part of the same device, while, in further embodiments, characterization device 700 and user device 708 may be linked together by a communication links. These components are described in greater detail below.

The data characterization device 702 illustrated in FIG. 7 includes a controller that is part of or associated with the data characterization device 702. The exemplary controller is adapted for controlling characterizations of textual data received by the system 700. The controller includes a processor 710, which controls the overall operation of the data characterization device 702 by execution of processing instructions that are stored in memory 714 connected to the processor 710.

The memory 714 may represent any type of tangible computer readable medium such as random access memory (RAM), read only memory (ROM), magnetic disk or tape, optical disk, flash memory, or holographic memory. In one embodiment, the memory 714 includes a combination of random access memory and read only memory. The processor 710 can be variously embodied, such as by a single core processor, a dual core processor (or more generally by a multiple core processor), a digital processor and cooperating math coprocessor, a digital controller, or the like. The digital processor, in addition to controlling the operation of the data characterization device 702, executes instructions stored in the memory 714 for performing the parts of methods discussed herein. In some embodiments, the processor 710 and the memory 714 may be combined in a single chip.

The data characterization processes disclosed herein are performed by the processor 710 according to the instructions contained in the memory 714. In particular, the memory 714 stores a data abstraction module 716, which generates data abstractions based on input textual data and user input; and a user interface module 718, which presents data for a user on user device 708 and receives information from the user on user device 708. Embodiments are contemplated wherein these instructions can be stored in a single module or as multiple modules embodied in the different devices.

The software modules as used herein, are intended to encompass any collection or set of instructions executable by the data characterization device 702 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the data characterization device 702 may be all connected by a bus 728.

With continued reference to FIG. 7, the data characterization device 702 also includes one or more communication interfaces (e.g. an input 730A and an output 730B), such as network interfaces, for communicating with external devices and/or between internal processes. The communication interfaces may include, for example, user input devices, a display, a modem, a router, a cable, and and/or Ethernet port, etc. The communication interfaces 730 are adapted to receive textual data as input (e.g. original textual data 732A and new textual data 732B). Additionally, the communication interfaces are adapted to receive a user input 734 via, for example, the user device 708.

The data characterization device 702 may include one or more special purpose or general purpose computing devices, such as a server computer or any other computing device capable of executing instructions for performing the exemplary method.

With continued reference to FIG. 7, the system 700 includes a storage device 706 that is part of or in communication with the data characterization device 702. In a contemplated embodiment, the data characterization device 702 can be in communication with a server (not shown) that includes a processing device and memory, such as the storage device 706.

With continued reference to FIG. 7, the textual data and/or the user input 734 undergoes processing by the data characterization device 702 to output data characterization output 738, which can include, for example, data abstraction information, exemplary data records, and extracted textual data. Such data characterization output 738 can be provided to the user device 708 and presented via, for example, a graphic user interface (GUI) 740.

The GUI 740 can include a display, for displaying information, such as data abstraction information, exemplary data records, and/or extracted textual data, and a user input device, such as a keyboard or touch or writable screen, for receiving instructions as input, and/or a cursor control device, such as a mouse, trackball, or the like, for communicating user input information and command selections to the processor 710.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more" of with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   receiving a first set of textual data comprising a first plurality of semi-structured data records;
   generating, using one or more processors, a first data abstraction based on the first set of textual data by performing multi-sequence alignment on the first plurality of semi-structured data records by determining a minimum edit distance between strings in the first plurality of semi-structured data records;
   presenting the first data abstraction via a user interface;
   determining a plurality of changes to the first data abstraction based on input to the user interface, wherein:
   a first change of the plurality of changes comprises instructions, received via the user interface, to extend a region in the first data abstraction to include addition content; and
   a second change of the plurality of changes comprises instructions, received via the user interface, to split a region in the first data abstraction into multiple regions;
   generating a second data abstraction based on the plurality of changes;

structuring the semi-structured data records in the first set of textual data using the second data abstraction to create structured data records;
extracting characterized textual data from the structured data records;
receiving a second set of textual data comprising a second plurality of data records;
matching data records in the second plurality of data records to the second data abstraction to determine a number of data records that are a match and a number of data records that are not a match;
calculating a percentage of data records of the second plurality of data records that are a match using the number of data records that are a match and the number of data records that are not match;
extracting characterized textual data from the second set of textual data using the second data abstraction in response to determining that the percentage of data records of the second plurality of data records is greater than or equal to a threshold percentage;
receiving a third set of textual data comprising a third plurality of data records;
determining one or more required regions for extraction from the third set of textual data;
determining that there is a missing region of the one or more required regions based on failing to identify the missing region in the third set of textual data; and
presenting, via the user interface, an indication of the missing region that was determined.

2. The method of claim 1, further comprising:
determining one or more required regions for extraction from the second set of textual data, wherein extracting characterized textual data from the second set of textual data is further in response to determining that the one or more required regions are identified in the second set of textual data.

3. The method of claim 1, wherein generating the first data abstraction based on the first set of textual data comprises generating the first data abstraction based on a subset of the first plurality of semi-structured data records of the first set of textual data.

4. The method of claim 1, wherein the first data abstraction and the second data abstraction comprise regular expressions.

5. The method of claim 1, wherein presenting the first data abstraction via the user interface comprises:
selecting an exemplary data record of the first plurality of semi-structured data records;
determining one or more regions in the exemplary data record that match one or more regions in the first data abstraction;
characterizing one or more regions in the exemplary data record using the first data abstraction;
presenting the exemplary data record via the user interface;
highlighting characterized regions in the exemplary data record; and
tagging characterized regions in the exemplary data record.

6. The method of claim 1, wherein the input to the user interface further comprises instructions to perform one or more of reducing a region and merging a region.

7. A system comprising:
a processing system comprising one or more processors; and
a memory system comprising one or more computer-readable media, wherein the one or more computer-readable media contain instructions that, when executed by the processing system, cause the processing system to perform operations comprising:
receiving a first set of textual data comprising a first plurality of semi-structured data records;
generating a first data abstraction based on the first set of textual data by performing multi-sequence alignment on the first plurality of semi-structured data records by determining a minimum edit distance between strings in the first plurality of semi-structured data records;
presenting the first data abstraction via a user interface;
determining a plurality of changes to the first data abstraction based on input to the user interface, wherein:
a first change of the plurality of changes comprises instructions, received via the user interface, to extend a region in the first data abstraction to include addition content; and
a second change of the plurality of changes comprises instructions, received via the user interface, to split a region in the first data abstraction into multiple regions;
generating a second data abstraction based on the plurality of changes;
structuring the semi-structured data records in the first set of textual data using the second data abstraction to create structured data records;
extracting characterized textual data from the structured data records;
receiving a second set of textual data comprising a second plurality of data records;
matching data records in the second plurality of data records to the second data abstraction to determine a number of data records that are a match and a number of data records that are not a match;
calculating a percentage of data records of the second plurality of data records that are a match using the number of data records that are a match and the number of data records that are not match;
extracting characterized textual data from the second set of textual data using the second data abstraction in response to determining that the percentage of data records of the second plurality of data records is greater than or equal to a threshold percentage;
receiving a third set of textual data comprising a third plurality of data records;
determining one or more required regions for extraction from the third set of textual data;
determining that there is a missing region of the one or more required regions based on failing to identify the missing region in the third set of textual data; and
presenting, via the user interface, an indication of the missing region that was determined.

8. The system of claim 7, the operations further comprising:
determining one or more required regions for extraction from the second set of textual data, wherein extracting characterized textual data from the second set of textual data is further in response to determining that the one or more required regions are identified in the second set of textual data.

9. The system of claim 7, wherein generating the first data abstraction based on the first set of textual data comprises generating the first data abstraction based on a subset of the first plurality of semi-structured data records of the first set of textual data.

10. The system of claim 7, wherein the first data abstraction and the second data abstraction comprise regular expressions.

11. The system of claim 7, wherein presenting the first data abstraction via the user interface comprises:
selecting an exemplary data record of the first plurality of semi-structured data records;
determining one or more regions in the exemplary data record that match one or more regions in the first data abstraction;
characterizing one or more regions in the exemplary data record using the first data abstraction;
presenting the exemplary data record via the user interface;
highlighting characterized regions in the exemplary data record; and
tagging characterized regions in the exemplary data record.

12. A non-transitory computer-readable medium containing instructions embodied thereon, wherein the instructions, when executed by a processor, cause the processor to perform operations comprising:
receiving a first set of textual data comprising a first plurality of data records;
generating a first data abstraction based on the first set of textual data by performing multi-sequence alignment on the first plurality of semi-structured data records by determining a minimum edit distance between strings in the first plurality of semi-structured data records;
presenting the first data abstraction via a user interface;
determining a plurality of changes to the first data abstraction based on input to the user interface, wherein:
a first change of the plurality of changes comprises instructions, received via the user interface, to extend a region in the first data abstraction to include addition content; and
a second change of the plurality of changes comprises instructions, received via the user interface, to split a region in the first data abstraction into multiple regions;
generating a second data abstraction based on the plurality of changes;
structuring the semi-structured data records in the first set of textual data using the second data abstraction to create structured data records;
extracting characterized textual data from the structured data records;
receiving a second set of textual data comprising a second plurality of data records;
matching data records in the second plurality of data records to the second data abstraction to determine a number of data records that are a match and a number of data records that are not a match;
calculating a percentage of data records of the second plurality of data records that are a match using the number of data records that are a match and the number of data records that are not match;
extracting characterized textual data from the second set of textual data using the second data abstraction in response to determining that the percentage of data records of the second plurality of data records is greater than or equal to a threshold percentage;
receiving a third set of textual data comprising a third plurality of data records;
determining one or more required regions for extraction from the third set of textual data;
determining that there is a missing region a required region of the one or more required regions based on failing to identify is not identified the missing region in the third set of textual data; and
presenting, via the user interface, an indication of the missing region that was determined.

13. The non-transitory computer-readable medium of claim 12, the operations further comprising:
determining one or more required regions for extraction from the second set of textual data, wherein extracting characterized textual data from the second set of textual data is further in response to determining that the one or more required regions are identified in the second set of textual data.

14. The non-transitory computer-readable medium of claim 12, wherein generating the first data abstraction based on the first set of textual data comprises generating the first data abstraction based on a subset of the first plurality of semi-structured data records of the first set of textual data.

15. The non-transitory computer-readable medium of claim 12, wherein the first data abstraction and the second data abstraction comprise regular expressions.

16. The non-transitory computer-readable medium of claim 12, wherein presenting the first data abstraction via the user interface comprises:
selecting an exemplary data record of the first plurality of semi-structured data records;
determining one or more regions in the exemplary data record that match one or more regions in the first data abstraction;
characterizing one or more regions in the exemplary data record using the first data abstraction;
presenting the exemplary data record via the user interface;
highlighting characterized regions in the exemplary data record; and
tagging characterized regions in the exemplary data record.

17. The non-transitory computer-readable medium of claim 12, wherein the input to the user interface further comprises instructions to perform one or more of reducing a region and merging a region.

18. The method of claim 1, wherein the multi-sequence alignment is performed using a suffix tree.

19. The system of claim 7, wherein the multi-sequence alignment is performed using a suffix tree.

20. The non-transitory computer-readable medium of claim 12, wherein the multi-sequence alignment is performed using a suffix tree.

* * * * *